US012568931B2

(12) United States Patent　　　　(10) Patent No.: US 12,568,931 B2
Brooks et al.　　　　　　　　　　　　(45) Date of Patent:　　　Mar. 10, 2026

(54) PET FEEDER

(71) Applicant: Pet Mate Ltd., Surrey (GB)

(72) Inventors: Steve Brooks, Surrey (GB); Jeremy Oates, Middlesex (GB)

(73) Assignee: PET MATE LTD., Hersham (GB)

( * ) Notice: Subject to any disclaimer, the term of this patent is extended or adjusted under 35 U.S.C. 154(b) by 103 days.

(21) Appl. No.: 18/561,783

(22) PCT Filed: May 18, 2022

(86) PCT No.: PCT/GB2022/000054
§ 371 (c)(1),
(2) Date: Nov. 17, 2023

(87) PCT Pub. No.: WO2022/243652
PCT Pub. Date: Nov. 24, 2022

(65) Prior Publication Data
US 2024/0237611 A1　　　Jul. 18, 2024

(30) Foreign Application Priority Data

May 18, 2021　(GB) ..................................... 2107116

(51) Int. Cl.
*A01K 5/01*　　　(2006.01)
*A01K 5/02*　　　(2006.01)
*A01K 11/00*　　(2006.01)
(52) U.S. Cl.
CPC .......... *A01K 5/0142* (2013.01); *A01K 5/0291* (2013.01); *A01K 11/006* (2013.01)
(58) Field of Classification Search
USPC ........................ 119/51.02, 51.11, 51.01, 163
See application file for complete search history.

(56) References Cited

U.S. PATENT DOCUMENTS 3,763,825 A * 10/1973 Fleming ............... A01K 5/0291
　　　　　　　　　　　　　　　119/51.15
3,900,007 A * 8/1975 Smith .................. A01K 5/0291
　　　　　　　　　　　　　　　119/51.13
(Continued)

FOREIGN PATENT DOCUMENTS

CN　　　108477006 A　　9/2018
EP　　　　2818042 A2 * 12/2014　.......... A01K 1/0606
(Continued)

OTHER PUBLICATIONS

International Preliminary Report on Patentability in PCT/GB2022/000054 dated Nov. 21, 2023.
(Continued)

*Primary Examiner* — Timothy D Collins
*Assistant Examiner* — Maria E Graber
(74) *Attorney, Agent, or Firm* — Manelli Selter PLLC; Edward Stemberger

(57)　　　　　　ABSTRACT

A feeder for a domestic pet has a container for holding pet food, a housing, and a cover having a closed position to prevent access to pet food in the container and an open position. The housing has an open front, a base, respective left and right sidewalls and a rear wall coupled to the base and to the sidewalls. The container is located in the base. The rear wall extends upwardly from the base and forwardly to provide a roof for the housing and terminates in a forward edge at the open front. The open front is bounded by the forward edge of the roof, forward edges of the sidewalls, and a line joining bottoms of the forward edges of the sidewalls. This line is parallel to the forward edge of the roof but forwardly thereof. The sidewalls have intermediate portions thereof located at positions between the forward edge of the roof and the said line. These intermediate portions extend more forwardly than a plane containing the forward edge of the roof and the said line. An RFID aerial is provided to
(Continued)

detect the presence of an authorised RFID chip in a pet approaching the open front. The RFID aerial extends across the side walls and the roof at positions adjacent the forward edges of the side walls and of the roof. The cover is coupled to an electric motor operable when the RFID aerial detects the presence of an authorised RFID chip for movement of the cover from its closed to its open position.

28 Claims, 11 Drawing Sheets

(56)                References Cited

U.S. PATENT DOCUMENTS

| | | | | |
|---|---|---|---|---|
| 4,532,892 | A * | 8/1985 | Kuzara | A01K 11/006 |
| | | | | 119/51.02 |
| 5,826,538 | A * | 10/1998 | Roybal | A01K 5/0291 |
| | | | | 119/51.12 |
| 6,880,722 | B2 * | 4/2005 | Anderson | A61M 15/0051 |
| | | | | 206/531 |
| 7,395,782 | B1 * | 7/2008 | Lindsay | A01K 5/025 |
| | | | | 119/51.02 |
| 7,458,336 | B2 * | 12/2008 | Eu | A01K 5/0142 |
| | | | | 119/51.01 |
| 9,241,473 | B2 * | 1/2016 | Fredericks | A01K 5/0142 |
| 10,849,312 | B2 * | 12/2020 | Hill | A01K 5/0283 |
| 2002/0134313 | A1 * | 9/2002 | Andrew King | A01K 5/025 |
| | | | | 119/51.02 |
| 2003/0193445 | A1 * | 10/2003 | Mejia | H01Q 7/00 |
| | | | | 343/742 |
| 2006/0249088 | A1 * | 11/2006 | Eu | A01K 11/006 |
| | | | | 119/51.02 |
| 2006/0272584 | A1 | 12/2006 | Sprague | |
| 2007/0107667 | A1 | 5/2007 | Morris | |
| 2008/0289580 | A1 | 11/2008 | Krishnamuthy | |
| 2011/0297090 | A1 * | 12/2011 | Chamberlain | A01K 5/0291 |
| | | | | 119/51.02 |
| 2011/0297091 | A1 * | 12/2011 | Chamberlain | A01K 5/0142 |
| | | | | 119/702 |
| 2015/0101543 | A1 | 4/2015 | Baxter et al. | |
| 2015/0269798 | A1 * | 9/2015 | Small | A01K 11/006 |
| | | | | 119/51.02 |
| 2016/0212971 | A1 * | 7/2016 | Hill | A01K 5/0114 |
| 2017/0290290 | A1 * | 10/2017 | Trottier | A01K 5/02 |
| 2019/0029221 | A1 | 1/2019 | Anderton et al. | |

FOREIGN PATENT DOCUMENTS

| | | | | | |
|---|---|---|---|---|---|
| GB | | 2595585 | A * | 12/2021 | A01K 5/0114 |
| GB | | 2606735 | A * | 11/2022 | A01K 11/006 |
| WO | | 2011110822 | A2 | 9/2011 | |
| WO | WO-2015028794 | A2 * | 3/2015 | A01K 11/006 |

OTHER PUBLICATIONS

International Search Report in PCT/GB2022/000054 dated Sep. 27, 2022.
GB Search Report in GB2107116.2 dated Oct. 26, 2023.

* cited by examiner

Cam and Base make
Contact/stop point

Link arm past cam centre.

Cam and Base make
Contact/stop point

PET FEEDER

This disclosure relates to pet feeders.

Numerous prior pet feeders have been proposed. The features common to all such feeders are a container for pet food and a cover intended to prevent access to pet food in the container except under a selected circumstance, a mechanism of some form being provided to open or remove the cover when such circumstance arises. In different embodiments of prior feeder:

The cover may be opened or removed by spring action or by an electric motor.

The feeder may be programmed to open or remove the cover at a pre-set time or after a pre-set interval.

The feeder may be programmed to open or remove the cover when the presence of a pet is detected.

The feeder may be programmed to open or remove the cover only when the presence of a specific pet is detected.

The feeder may be provided with a housing within which the container is located, the housing being box-like being enclosed apart from an open or openable front through which at least the pet's head must pass to reach the container.

It is now common for pets to be fitted with a subcutaneous RFID microchip for identification purposes at the back of the neck. This makes it possible to detect the presence of a specific pet approaching the feeder and for the mechanism to be operated only when an (or the) authorised RFID chip is detected.

Feeders operated by detection of an animal with an authorised RFID causing the mechanism to operate have been previously proposed, and find a use, for example when:

the animal, usually a cat, is a grazer, namely they eat their food a small amount at a time throughout the day, and the household has a second animal, such as a dog or a greedy cat that eats all its own food and would also eat the first cat's food;

a pet is on special diet, and there are other pets in the household that should not have or do not need that diet;

a pet needs medication in their food, and there are other pets in the household; and food is left for a pet for some time, and the owner wishes to avoid insect contamination, so that there is a need to provide a mechanism to open a cover over the food when a pet is detected, and to close it when no pet is detected.

In this last case, discrimination between pets may not be needed, and if there is only one pet in the household, then discrimination between pets is obviously unnecessary. However, when there is more than one pet in a household, by having one or more RFID-controlled feeders each pet can have their own intended food and no other pet can eat it. The present disclosure in some of its aspects relates to such feeders; while in other aspects, RFID control is not needed, as will be explained below.

Thus, preventing unauthorised pets from reaching the food is important. When a pet with an authorised RFID is programmed into the system, the feeder should prevent any other pet getting to the food, whether this be by reaching the container while it is open so that the authorised pet may feed, or by opening the cover by force. At the same time the RFID detection system must be capable of reliably detecting the authorised pet. Cats in particular tend to be diffident in approaching food, and so the field in which the RFID can be detected should extend as far forward as possible to detect an authorised RFID chip at the rear of a pet's neck.

Detection of an RFID chip requires an aerial loop capable of detecting the presence of an authorised RFID chip, and, for the reasons explained above, the aerial must be located as far forward as possible to allow detection of an authorised RFID chip as early as possible so that the mechanism can operate to open or remove the cover before the pet in question reaches the container.

The ideal solution to this problem would be the provision of an otherwise closed box-like housing as noted above, through an open or openable front of which the pet's head must pass to reach the container, the loop aerial being mounted around the open front. To prevent two pets eating alongside each other the open or openable front must be relatively narrow. However, cats, in particular, are reluctant to put their heads into an otherwise closed housing with a narrow opening and then to feed, as they feel entrapped.

In an attempt to overcome the problem of a pet feeling enclosed, the feeder disclosed in WO 2015/028794 Sureflap Ltd has an otherwise open arrangement apart from a ring-like frame in which the RFID detecting loop aerial may be located, the frame with its aerial loop being angled backwardly away from an open front of the feeder. The feeder has a two- or more-part cover over the container which folds to reveal the food to a detected animal.

We have found that in practice this arrangement suffers from a number of problems:

Particularly with a cat reluctant to push its head forward unless food is revealed, the angled backwards loop may provide inadequate coupling with an RFID chip at the back of the cat's neck to provide detection.

The folding action necessarily requires the cover to rear up in front of a pet. We have found that many cats find this frightening. To get them accustomed to the feeder involves a lengthy training programme. Indeed, one such training programme involving the folding cover moving by increasing degrees until the pet is no longer frightened is described in WO 2015/028794 as a preferred embodiment of the feeder.

Although the embodiments illustrated in WO 2015/028794 have small triangular side walls supposedly to prevent a second unauthorised pet from approaching the food container, we have found that in practice, this is insufficient to deter another cat or a dog, the generally open arrangement present in all the embodiments disclosed in WO 2015/028794 readily allowing an unauthorised pet to approach from the rear over the folded cover or from the sides over or around the triangular side walls and through the gaps between the folded cover and the side walls (See FIG. 3 of WO 2015/028794).

The frame in which the RFID detecting loop aerial is located presents a step to the pet at the lower forward edge, on to or over which some cats are reluctant to step.

The present disclosure has arisen from our work seeking to overcome the above and other problems encountered with prior pet feeders. The several aspects of this disclosure set out below represent solutions to different ones of these problems. It will be understood, that specific embodiments of feeder envisaged by this disclosure based upon the teachings of this disclosure need not necessarily embody all of these aspects.

In a first aspect of this disclosure, there is provided: a feeder for a domestic pet, the feeder comprising:

a container for holding pet food;

a housing having an open front, a base, respective left and right sidewalls and a rear wall coupled to the base and to the sidewalls, the container being located in the base, and the rear wall extending upwardly from the base and forwardly to provide a roof for the housing and terminating in a forward edge at the open front, whereby the open front is bounded by the forward edge of the roof, forward edges of the sidewalls, and a line joining bottoms of the forward edges of the sidewalls, which line is parallel to the forward edge of the roof but forwardly thereof, and the sidewalls having intermediate portions thereof located at positions between the forward edge of the roof and the said line which intermediate portions extend more forwardly than a plane containing the forward edge of the roof and the said line;

an RFID aerial to detect the presence of an authorised RFID chip in a pet approaching the open front; the RFID aerial extending across the side walls and the roof at positions adjacent the forward edges of the sidewalls and of the roof; and a cover having a closed position to prevent access to pet food in the container and an open position, the cover being coupled to an electric motor operable when the RFID aerial detects the presence of an authorised RFID chip for movement of the cover from its closed to its open position.

Preferred embodiments have one of more of the following features: The feeder has a power-saving mode in which the RFID aerial is inactive, a feature which is particularly important when the feeder is powered by batteries to avoid the need for power leads and for the feeder to be placed close to a mains electricity supply socket, the feeder comprising a detector, preferably a passive infrared detector, adapted to activate the RFID aerial when an object is detected by the detector in front of the feeder. The passive infrared detector comprises two passive infrared sensors, one of which is covered, so that the covered sensor always detects ambient temperature, a difference in sensed temperature between the sensors being indicative of a live object being detected.

Alternatively, the detector comprises a capacitive proximity system, or a touch mat located at the front of the feeder. In the case of a capacitive proximity system, the RFID aerial may be coupled to a radio frequency circuit when the capacitive proximity detector senses an animal in the vicinity of the feeder but may otherwise be decoupled therefrom, and the decoupled RFID aerial may serve as the said capacitive proximity detector being connected into a capacitance measurement circuit at least when so decoupled.

Preferably, the RFID aerial extends across each sidewall in a plurality of generally straight sections from the roof to the bottoms of the forward edges of the sidewalls. The RFID aerial may extend in two major generally straight sections, optionally with a minor straight section from the roof to the bottom of the forward edge of each sidewall. The angle between the two major generally straight sections is between 100° and 170°, preferably between 110° and 160°, and most preferably between 120' and 150°. In a preferred embodiment the angle between the two major generally straight sections is around 135°.

In an alternative arrangement, the RFID aerial may extend in a curve from the roof to the bottom of the forward edge of each side wall.

In a preferred arrangement, the RFID aerial does not form a full loop through which the pet's head must pass to reach the container, having no part thereof extending along the said line joining bottoms of the forward edges of the sidewalls, thereby avoiding a step being present at the lower front of the feeder over or on to which a pet must step to reach food in the container.

Other preferred embodiments have one or more of the following features: The feeder comprises a timer, and the cover is only openable during one or more selected windows of time. This may be achieved by the aerial only being operable during the said window(s). The feeder may provide a visual and/or audible signal that a pet may be trained to notice as an indication that the feeder is operable to allow them to reach the food within it. There is a variable time delay adjustable by an owner to adjust how long the cover should remain in its open position after a programmed pet leaves the feeder. The motor is battery powered. There is more than one motor. The cover is formed in one piece.

In preferred embodiments, the cover is pivoted to the sidewalls at respective pivots located above the container, and the motor is coupled to the cover by a linkage coupled to at least one said pivot and comprising a link arm and a rotatable drive cam, the link arm being connected to the cam so that when the cover is in its closed position, the link arm is positioned past dead centre of the cam so that pushing the forward edge of the cover by a pet is ineffective in moving the cover. The linkage is preferably on the opposite side of a or each sidewall from the cover. The cover is preferably removable from the rest of the feeder for cleaning, being coupled to the pivots by respective sprung pin connectors. In a more preferred embodiment there are two motors, each motor being coupled to the cover by a linkage coupled to at least one said pivot and comprising a link arm and a rotatable drive cam, the link arm being connected to the cam so that when the cover is in its closed position, the link arm is positioned past dead centre of the cam so that pushing the forward edge of the cover by a pet is ineffective in moving the cover. The feeder may additionally include a biasing means, for example a counterbalance spring, biasing the cover towards its closed position.

According to a second and alternative aspect of this disclosure, we provide a feeder for domestic pets, the feeder comprising:

a container for holding pet food;

a housing having an open front, a base, respective left and right sidewalls and a rear wall coupled to the base and to the sidewalls, the container being located in the base;

a moveable cover having a closed position to prevent access to pet food in the container and an open position, the cover being pivotable about respective pivots in the left and right sidewalls, and being coupled to an electric motor operable for pivotal movement of the cover from its closed to its open position in a direction away from the open front and generally along an inner surface of the rear wall.

Preferred embodiments have one or more of the following features: The motor is coupled to the cover by a linkage coupled to at least one said pivot and comprising a link arm and a rotatable drive cam, the link arm being connected to the cam so that when the cover is in its closed position, the link arm is positioned past dead centre of the cam so that pushing the forward edge of the cover by a pet is ineffective in moving the cover. There are two motors, each motor being coupled to the cover by a linkage coupled to at least one said pivot and comprising a link arm and a rotatable drive cam, the link arm being connected to the cam so that when the cover is in its closed position, the link arm is positioned past dead centre of the cam so that pushing the forward edge of the cover by a pet is ineffective in moving the cover. The linkage is on the opposite side of a or each sidewall from the cover. The feeder includes a biasing means, for example a counterbalance spring, biasing the cover towards its closed position. The cover is removable from the rest of the feeder for cleaning, being coupled to the pivots by respective sprung pin connectors. The sidewalls extend forwardly towards the open front further than the base so that no change of level is presented to a pet entering the open front until it reaches the container. The feeder comprises a timer, and the cover is only openable during one or more selected windows of time. There is a variable time delay adjustable by an owner to adjust how long the cover should remain in its open position after a programmed pet leaves the feeder. The feeder may provide a visual and/or audible signal that a pet may be trained to notice as an indication that the feeder is operable to allow them to reach the food within it. The or each motor is controlled by an RFID detector system designed to detect a pet in the vicinity of the feeder with an authorised RFID chips mounted subcutaneously. The or each motor is controlled to move the cover to its open position when a pet is sensed in the vicinity of the feeder by a passive infrared detector or by a capacitive proximity detector.

In a third alternative aspect of this disclosure, we provide a feeder for domestic pets, the feeder comprising:

a container for holding pet food;

a housing having an open front, a base, respective left and right sidewalls and a rear wall coupled to the base and to the sidewalls, the container being located in the base, and the rear wall extending upwardly from the base and forwardly to provide a roof for the housing and terminating in a forward edge at the open front, the forward edge of the roof being vertically above the container, the container having a forward edge and the sidewalls extending forwardly beyond the forward edge of the container;

the open front being bounded by the forward edge of the roof, forward edges of the sidewalls, and a line joining bottoms of the forward edges of the sidewalls, which line is parallel to the forward edge of the roof but forwardly thereof;

a cover having a closed position to prevent access to pet food in the container and an open position to allow access to the pet food;

the left and right sidewalls and the rear wall preventing access by a pet to the food from the rear or from either of the two sides of the feeder, and allowing access for only a single pet at a time through the open front to pet food in the container with the cover in its open position.

We provide, in a fourth alternative aspect of this disclosure, a feeder for domestic pets, the feeder comprising:

a container for holding pet food;

a housing having an open front, a base, respective left and right sidewalls and a rear wall coupled to the base and to the sidewalls, the container being located in the base;

a moveable cover having a closed position to prevent access to pet food in the container and an open position, the cover being coupled to an electric motor operable for movement of the cover from its closed to its open position; and a pet detection system, the motor being prevented from operation to move the cover to its open position unless a pet is detected by the pet detection system, the pet detection system comprising two identical passive infrared sensors mounted on the feeder, one of which is covered, so that the covered detector always detects ambient temperature, and the other sensor being directed forwardly through the open front, a difference in sensed temperature between the sensors being indicative of a pet in front of the other sensor.

We provide, in a fifth alternative aspect of this disclosure, a feeder for domestic pets, the feeder comprising:

a container for holding pet food;

a moveable cover having a closed position to prevent access to a first portion of pet food in the container and an open position to allow access to the first portion of pet food in the container, the cover being pivotable from its closed to its open position;

the cover comprising a retainer for holding a second portion of pet food.

Preferred embodiments have one or more of the following features: when the cover is in its open position, any food in the retainer will fall into the container. The retainer comprises a wall provided on the cover. The cover is mountable in at least two different orientations. The cover is mountable in an orientation that provides a retainer for holding a second portion of pet food positioned near to the front of the feeder. The cover is mountable in an orientation that provides a retainer for holding a second portion of pet food positioned near to the rear of the feeder.

We provide, in a sixth alternative aspect of this disclosure, a feeder for domestic pets, the feeder comprising:

a housing;

a container for holding pet food within the housing;

an aperture allowing a pet to access the pet food in the container within the housing;

the size of the aperture being adjustable.

Preferred embodiments have one or more of the following features: the size of the aperture can be adjusted by using an aperture adjuster to cover part of the aperture. The aperture adjuster is formed from plastics material. The aperture adjuster is made from one or more of: polypropylene or ABS. The aperture adjuster is trimmable to a desired size. Two or more aperture adjusters are provided. The feeder is provided with a range of differently sized aperture adjusters that provide different size apertures. The or each aperture adjuster has s a fastener to fasten the adjuster to the feeder.

Reference may be made, by way of example only, to the description hereinbelow of specific embodiments of feeder in accordance with the various teachings of this disclosure, with reference to the accompanying drawings, in which:

FIG. 1 shows an embodiment of a pet feeder in accordance with teachings of this disclosure, as seen from the front and the left;

FIG. 2 shows the pet feeder of FIG. 1 as seen from the rear and the right;

Figures 1, 2:
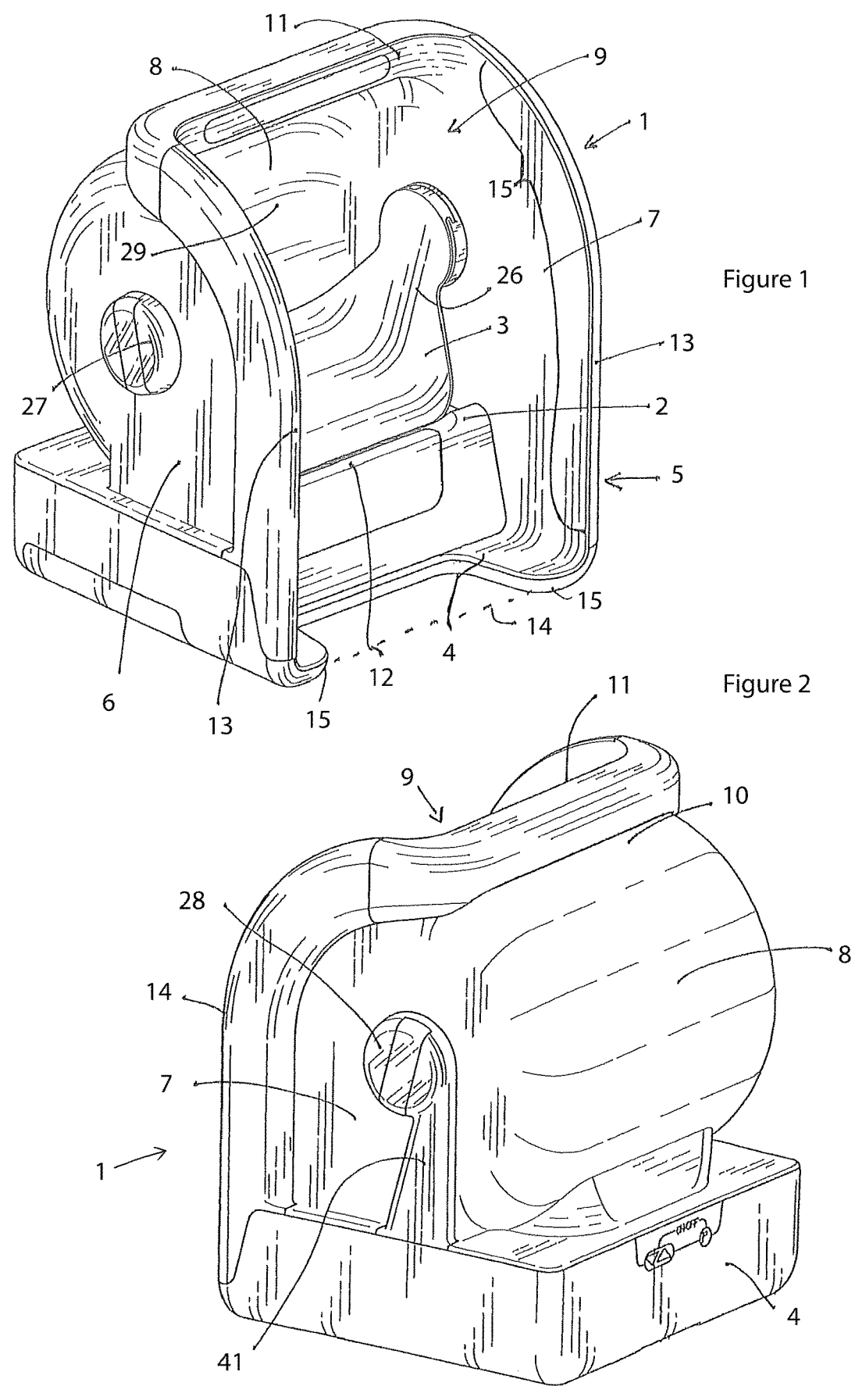
Figures 3, 4:
FIG. 3 is a top plan view of the feeder of FIGS. 1 and 2.
FIG. 4 is a front elevational view of the feeder of FIGS. 1 to 3.

The embodiment of pet feeder 1 shown in FIGS. 1 to 4 includes a container 2 for pet food, preferably removable from the feeder for cleaning, together with a movable cover 3 shown in its closed position in these Figures. The container 2 is mounted in the base 4 of a housing 5 comprising the base 4, left 6 and right 7 sidewalls and a rear wall 8 coupled to the base 2 and sidewalls 6, 7. As will be apparent from these Figures, the housing 5 has an open front 9. In this embodiment, the rear wall 8 extends upwardly from the base and forwardly to provide a partial roof 10 for the housing 5, but a partial roof may not always be necessary, as the open front 9 is sized to allow only one pet, suitably a cat, at a time to approach the food container 2 through the open front 9, while the rear wall 8 and the sidewalls 6, 7 prevent a second pet reaching the food while the first pet is present.

In this embodiment, roof 10 terminates in a forward edge 11 which is vertically above the food container 2, and the sidewalls 6, 7 extend forwardly beyond forward edge 12 of the food container. Thus, while still being protected from approach by other pets at the sides and rear, a feeding cat will not feel enclosed because the housing is open above as far as the food container, as can readily be seen from FIGS. 5 and 6.

As best shown in FIGS. 1 and 3, the open front 9 is bounded by the forward edge 11 of the roof 10, forward edges 13 of the respective side walls 6, 7, and a line 14 shown in hatched lines in the top plan view of FIG. 4 which effectively extends between the bottoms 15 of the forward edges 13 of the sidewalls. Line 14 is parallel to forward edge 11 of the roof 10, so that line 14 and forward edge 11 lie in a common plane. It can readily be seen that the sidewalls 6, 7 have intermediate portions located at positions between forward edge 11 and line 14 that extend more forwardly than this plane. Not only does this geometry provide good protection for a feeding cat from the sides, but it also confers other technical benefits as explained below.

Figure 7:
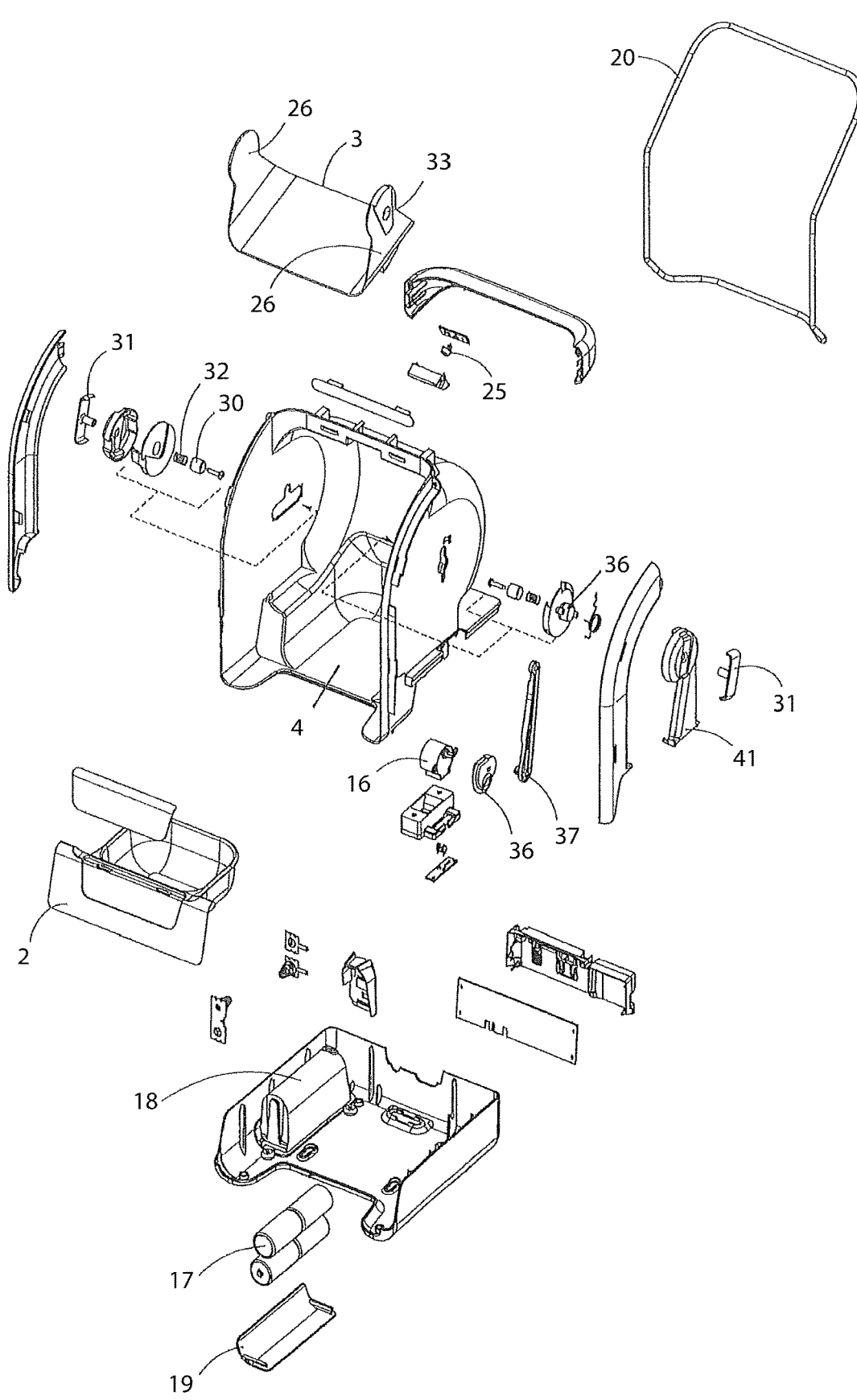
FIG. 7 is an exploded view of one practical embodiment of pet feeder in accordance with teachings of this disclosure.

Referring to the exploded view of FIG. 7, cover 3 is coupled to a motor 16, preferably a step motor, for movement between a closed position covering the container 2 and an open position under control of one or both of a pet detection system and a timer. Motor 16 is preferably battery driven so that there are no restrictions required by a power lead and availability of a mains electric supply on where the feeder 1 may be placed, replaceable batteries 17 being mounted in a battery compartment 18 with a removable cover 19.

The preferred pet detection system is an RFID system comprising an RFID loop aerial 20 to detect an authorised RFID mounted subcutaneously in the back of the neck of a pet approaching the open front 9. Because some cats are rather diffident in approaching their food bowl anyway, and would be even more reluctant to approach a closed food container with an opening cover, it is important that the cover be moved to its open position as soon as possible and as inconspicuously as possible in a manner that does not frighten the cat as an authorised cat approaches the feeder. In turn, this means that the aerial must detect an authorised RFID chip as far forward of the food container as possible.

In the RFID controlled feeder disclosed in WO 2015/028794, the loop aerial is located in a frame through which the cat's head must pass to reach food. This frame is swept backwardly at a substantial angle (See FIG. 12 of WO 2015/028794) which makes it difficult for the upper portion of the loop to sense an RFID chip. The top third of the loop is particularly important in sensing a subcutaneous chip at the back of a cat's neck if the frame is sized proportionately to the size of a domestic cat.

Figure 8:
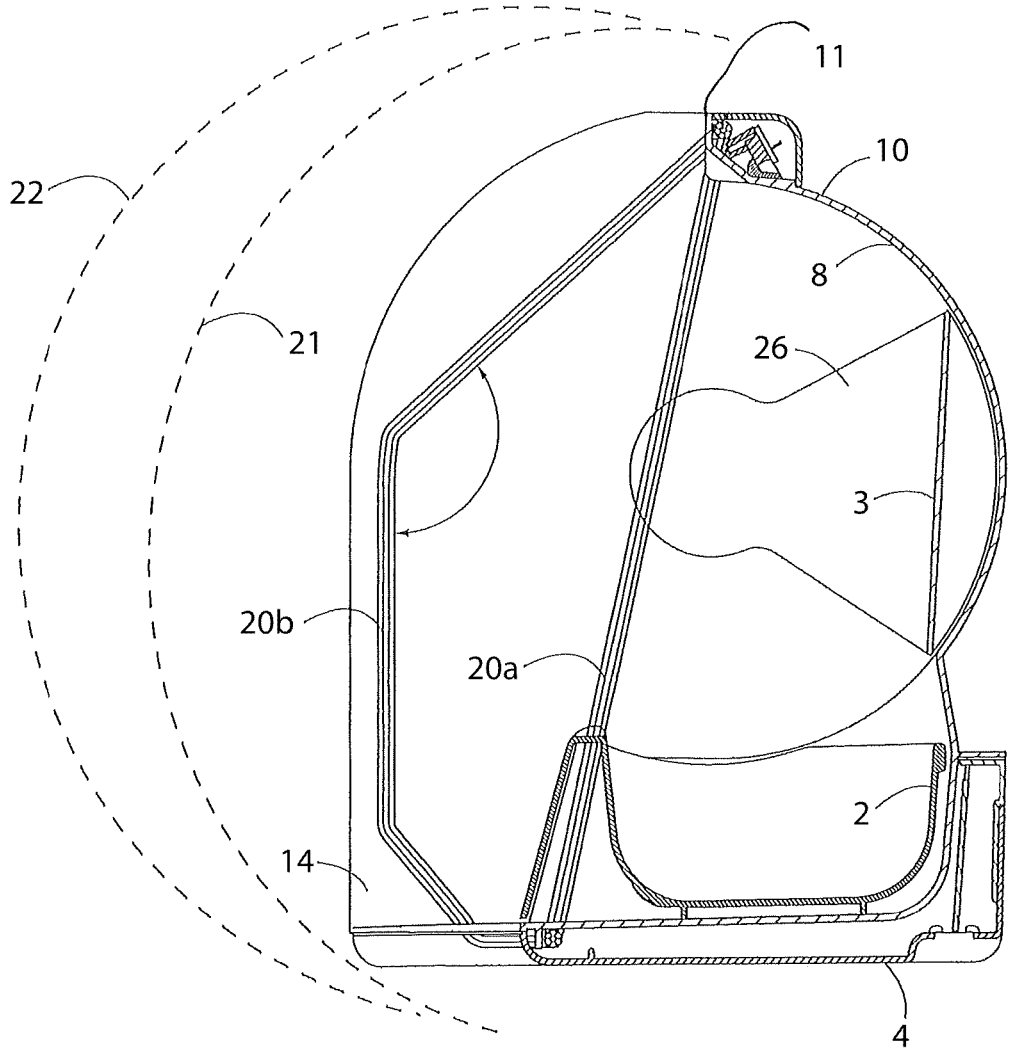
FIG. 8 is a schematic view of a pet feeder as seen from the right showing two potential positions for a loop aerial extending across the right sidewall of the feeder.

We have carried out experiments with the feeder shown in FIGS. 1 to 4 of the present Application, placing the loop aerial in two alternative positions shown in FIG. 8. When a loop aerial 20*a* extends at an angle across the respective sidewalls from a lower portion of the sidewall to the forward edge of the roof, albeit at less of an angle than that of the swept back loop of WO 2015/028794, RFID chips can be reliably sensed out to a first distance represented schematically by the curve 21 in FIG. 8. However, when the loop aerial extends across the sidewall in a plurality of generally straight sections as shown at 20*b*, the distance at which RFID chips can be reliably sensed, as indicated schematically by curve 22 is significantly increased. That this should prove to be so especially in the top third of the loop is somewhat surprising given that the upper reach of the loop along the forward edge of the roof is in the same position for loops 20*a* and 20*b*.

In loop 20*b*, there are two major generally straight loop sections and a minor generally straight section which we regard as optional. We have found that for best results the angle between the two major generally straight sections is around 135°. Put another way, this angle is suitably between 100° and 170°, preferably between 110° and 160°, and most preferably between 120° and 150°.

It will readily be appreciated that a loop aerial 20 such as loop 20*b* extending across the side walls at positions adjacent the forward edges of the side walls is only possible if the sidewalls 6, 7 have intermediate portions 15 located at positions between forward edge 11 of the roof and line 14 that extend more forwardly than the plane containing edge 11 and line 14, so that the shape of the sidewalls has an important bearing on the ability to provide an RFID loop aerial with enhanced ability to sense the presence of a pet with an authorised RFID chip. As an alternative to a plurality of generally straight sections in the sidewalls, the aerial may extend in each sidewall in a curve following the forward edge of the sidewall.

Figures 5, 6:
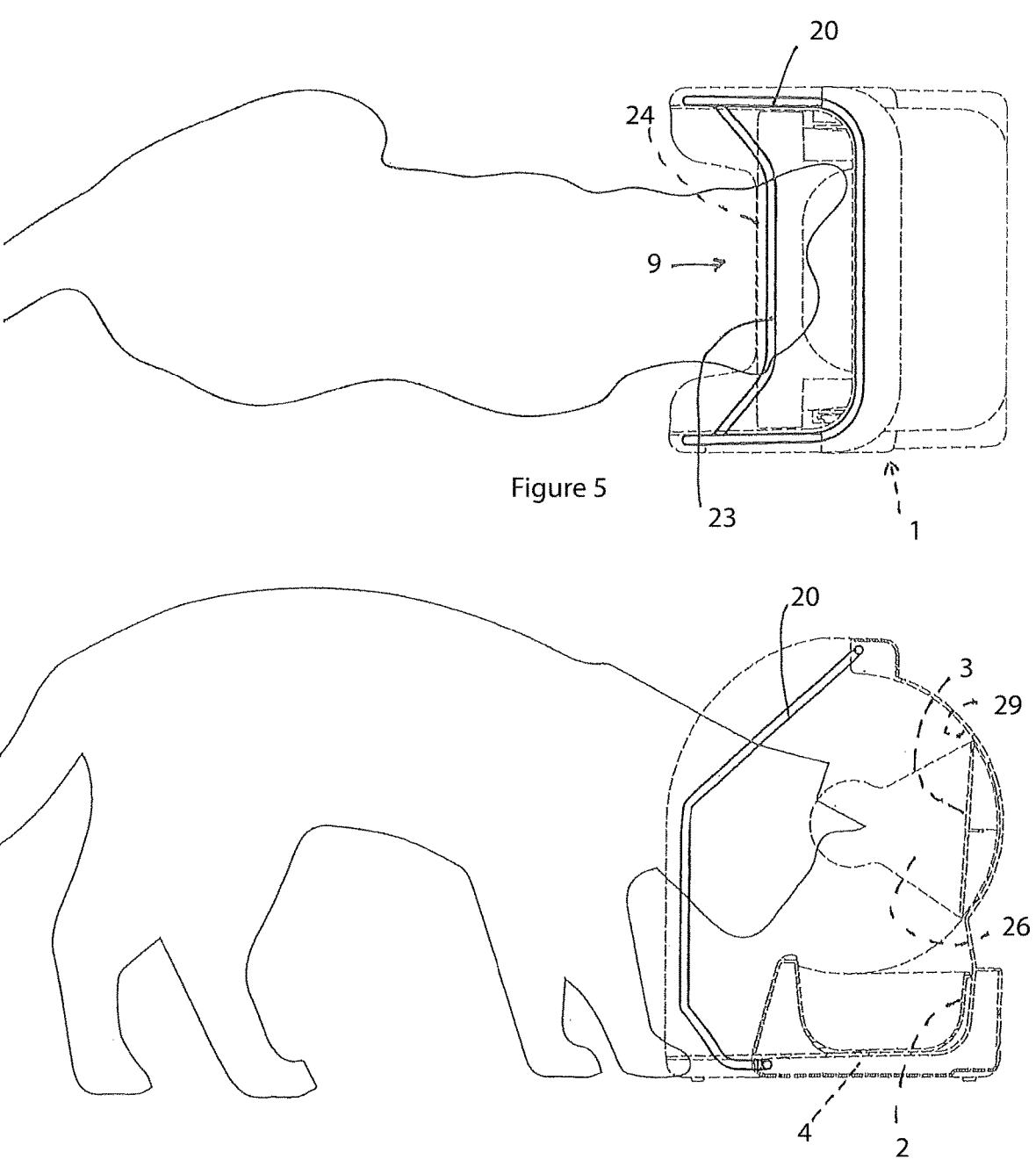
FIG. 5 is a view from above of a cat approaching the food container of a feeder with the feeder shown in phantom lines apart from its RFID loop aerial.
FIG. 6 is a view similar to that of FIG. 5 but as seen from the right side.

The most preferred geometry for the RFID loop aerial 20 is shown in FIGS. 5 and 6. It will be noted from the vertical view of FIG. 5 that lower run 23 of loop 20 follows forward edge 24 of base 4, which is recessed backwardly from the open front 9 so that there is an absence of any step or level change presented to a cat as it enters through the open front. We have found that some cats are put off by such a step, such as that presented at the lower part of the open front of the feeder of WO 2015/028794.

To keep the power consumption low to allow for the feeder to be battery operated, the RFID detection system should be in sleep mode most of the time, only searching when a pet comes close. This can be achieved by the use of a detector adapted to activate the RFID aerial when a pet is detected in the vicinity of the open front of the feeder. Suitable such detectors are passive infrared (PIR) detectors. Conventional PIR detectors sense a temperature difference between two sensors. However, we have found that conventional PIR detectors with two PIR sensors A and B positioned behind a facetted lens which splits up the detection area into a plurality of adjacent regions sensed by sensors A and B, are not suitable for use with our feeder. With such conventional PIR detectors, presence of a moving live object is determined by the object crossing from an A region into a B region or vice-versa. This system works well at a distance, but if fitted to a feeder as shown in FIGS. 1 to 4 to sense a pet adjacent the open front of the feeder, the pet will inevitably cross several A and B regions, and no temperature difference will be detected. Accordingly, in our preferred arrangement, we use a PIR detector 25 (FIG. 7) or Pyro-electric Infrared Radial Detector with dual compensated sensors, one of which we cover, so that the covered sensor always detects ambient temperature, a difference in sensed temperature between the sensors being indicative of a live object being detected. We have found various PIR detectors to be useful, including the widely available PIR_D202X, PIR_D203B and PIR_D203S detectors from various suppliers, the latter being preferred. Thus, we can produce a cheap and reliable PIR detector that detects a cat close to the sensor and self compensates for changes in ambient temperature and in battery voltage simply by removing the facetted lens from a conventional PIR detector and covering one of its two PIR sensors. The PIR detector is preferably positioned at the top of the feeder. Cats are prone to rubbing themselves against objects, including feeders, and particularly the sides of feeders. Applicant has found that PIR detectors will be kept cleaner for longer the higher up the feeder they are positioned.

As a less preferred alternative to the above PIR detector, other embodiments employ a detector using a capacitive proximity system, or a touch mat located at the front of the feeder. In the preferred capacitive proximity system, the RFID aerial 20 is coupled to a radio frequency circuit when the capacitive proximity detector senses an animal in the vicinity of the feeder but is otherwise be decoupled therefrom, and the decoupled RFID aerial serves as the capacitive proximity detector being connected into a capacitance measurement circuit at least when so decoupled.

In some embodiments of feeder 1, where discrimination between different pets approaching the feeder is unnecessary, the feeder dispenses with the RFID detection system in its entirety, and simply employs a pet detector to cause the or each motor to move the cover 3 from closed to open positions when a pet is detected in the vicinity of the open front of the feeder. The above described PIR detector or capacitive proximity detector may be used for this purpose.

In any of the aforesaid embodiments, the feeder 1 may additionally employ a timer, and the cover 3 is only openable during one or more selected windows of time. In one such arrangement, the aerial and/or the PIR detector are only coupled to the power supply during the said window(s). The feeder may provide a visual and/or audible signal that a pet may be trained to notice as an indication that the feeder is operable to allow them to reach the food within it.

We also contemplate embodiments in which a timer, with or without an additional visual and/or audible signal, defines cover-open periods and cover-closed periods, operating the or each motor accordingly, without need of an RFID detector system or a PIR detector system.

As noted above, it is important that the cover 3 be moved to its open position as inconspicuously as possible in a manner that does not tend to frighten a cat. As will be seen from FIGS. 1 to 4, although not always necessary, in our preferred arrangement the cover 3 is generally U-shaped with respective arms 26 pivotally mounted to respective pivots 27, 28 in the left 6 and right 7 sidewalls. The motor 16 is coupled to the cover 3 to cause pivotal movement of the cover from its closed position (as shown in FIGS. 1 to 4) to its open position (as shown in FIGS. 5 and 6) in a direction away from the open front 9 and generally along an inner surface 29 of the rear wall 8. By using a pivotable cover, the cover 3 simply rolls away from a pet in contrast to rising up in a folding motion as in WO 2015/028794. In practice our cover 3 is suitably made of the same material as the housing and is similarly coloured to be as unnoticeable as possible.

Figure 9:
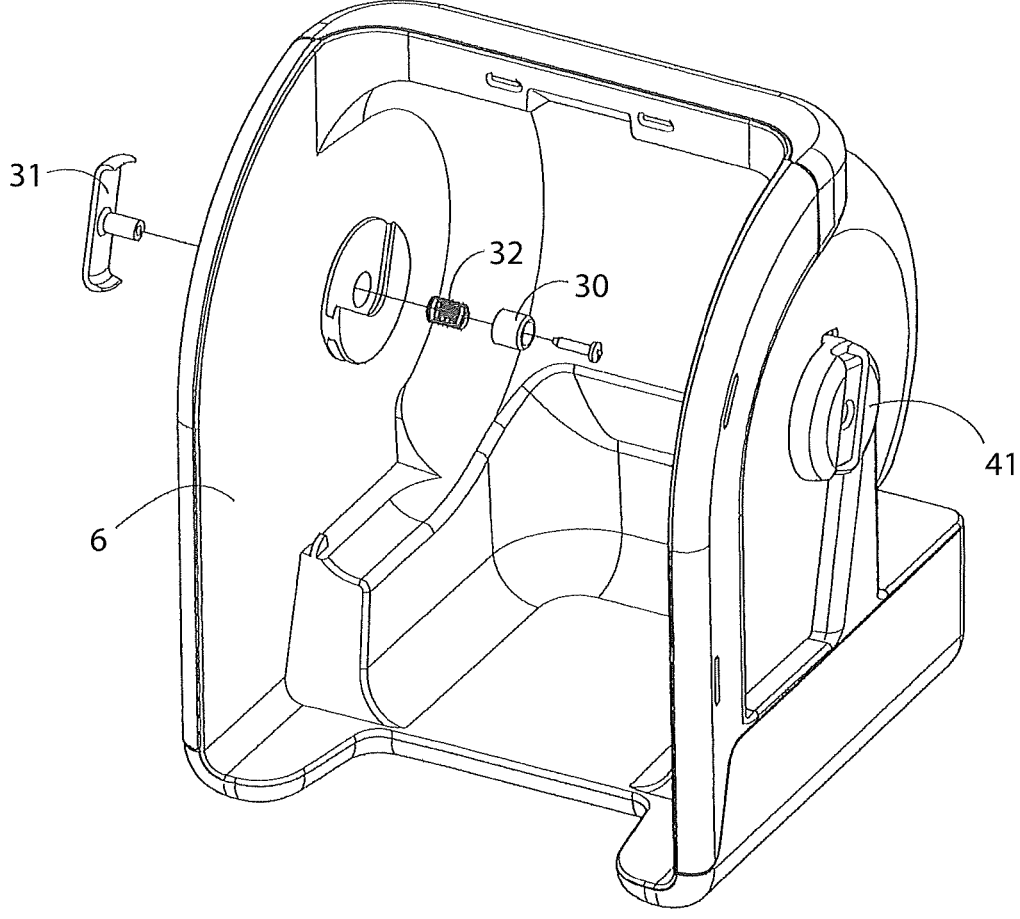
FIG. 9 is a perspective view from the front above and to the right illustrating the fitting of a sprung pin connector in a pivot in the left sidewall of the feeder.

In preferred embodiments, the cover is removable from the housing for cleaning. FIG. 9 shows how a sprung pin fitting, with a pin 30 coupled to an external clip 31 on the outer side of left sidewall 6 via an intermediate spring 32 between the pin 30 and the inner surface of the sidewall, may be fitted. The pins 30 fit into blind holes 33 (FIG. 7) in the arms 26 of the cover 3. Pulling the respective clips outwardly compresses the springs and withdraws the pins from the blind holes to release the cover.

Figure 10:
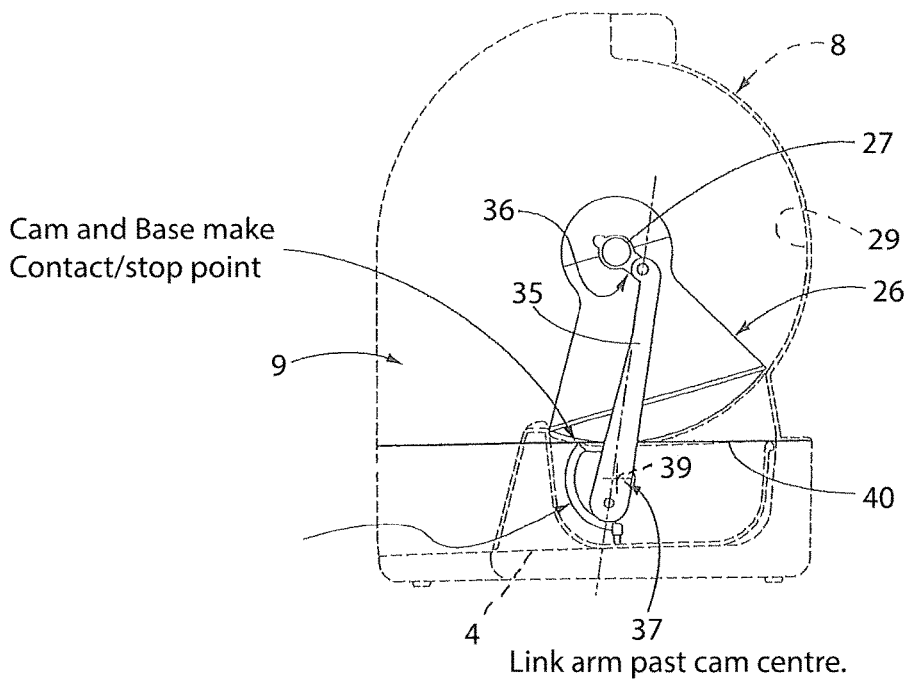
FIG. 10 is a view from the right, with parts omitted or in phantom for clarity showing a cover in its closed position and a linkage for moving it.
Figure 11:
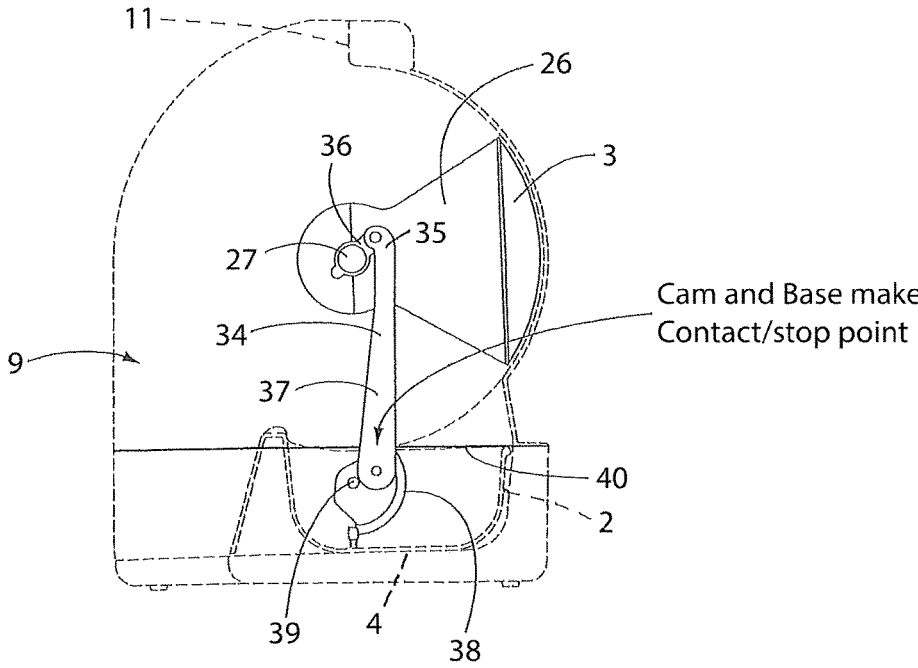
FIG. 11 is a view similar to FIG. 10 with the cover in its open position.

Motor 16 is coupled to the cover 3 by a linkage coupled to at least one of the pivots. In the illustrated embodiment shown in FIGS. 10 and 11, linkage 34 is coupled to pivot 27 and comprises a link arm 35 with two pivoted links 36 and 37 and a rotatable drive cam 38. The shorter link 36 is coupled to the pivot, while the longer link 37 is pivoted to the cam, which is coupled to motor axle 39. As can be seen from FIG. 10, when the cover is in its closed position, link 37 is positioned past dead centre of the cam. The result is that a pet attempting to open the cover by pushing at its forward edge will be ineffective in moving the cover. Stop points for travel of the cover in its open and closed positions are defined by edges of the cam making contact with the underside of a top wall 40 of the base 2, as shown in FIGS. 10 and 11. Preferably three positions are defined, namely: a) closed, b) open for pet to feed, and c) fully open to allow the food container to be removed. The linkage 34 is mounted on the outer side of sidewall 7 beneath a cover 41 to prevent the mechanism being contaminated by food.

Figure 12:
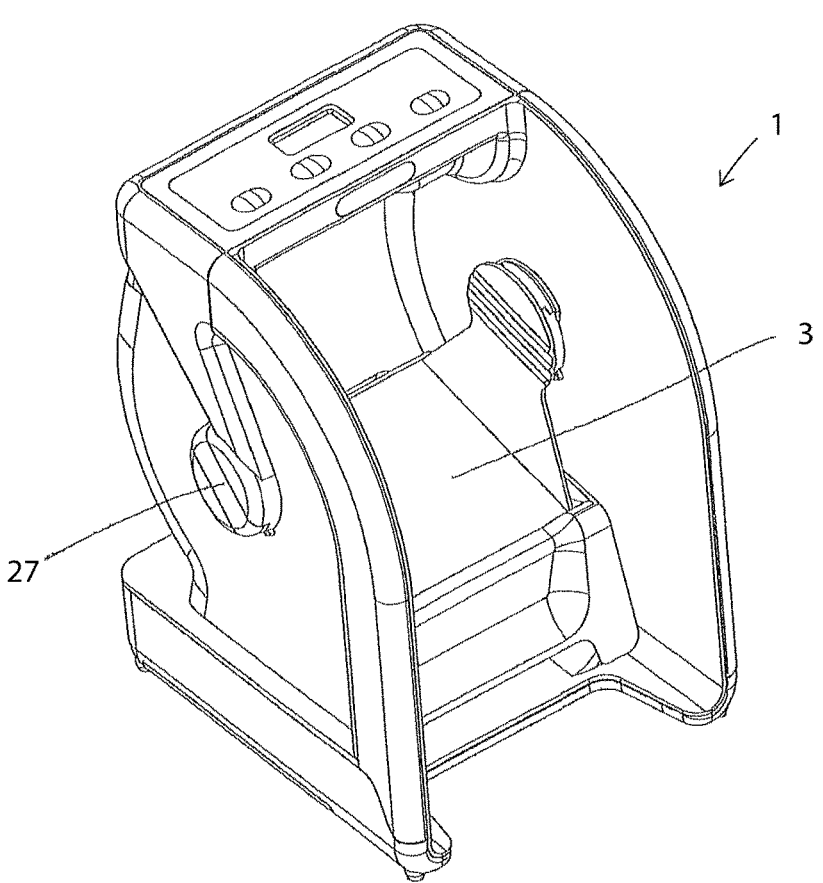
FIG. 12 is a front left perspective view of an alternative practical embodiment of pet feeder in accordance with teachings of this disclosure.
Figure 13:
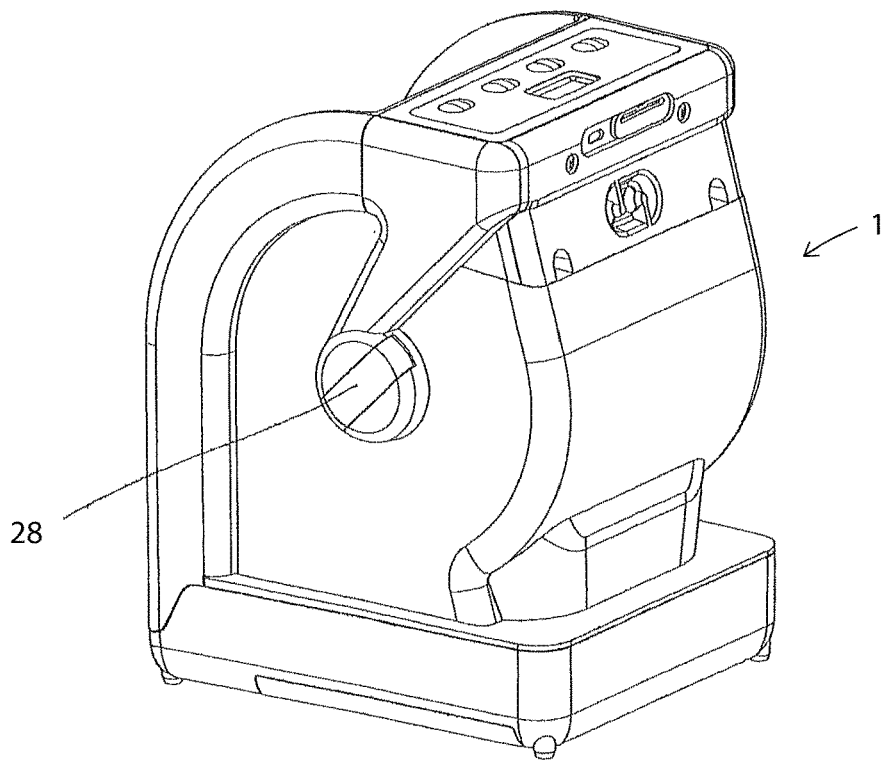
FIG. 13 is a rear right perspective view of the feeder shown in FIG. 12.
Figure 14:
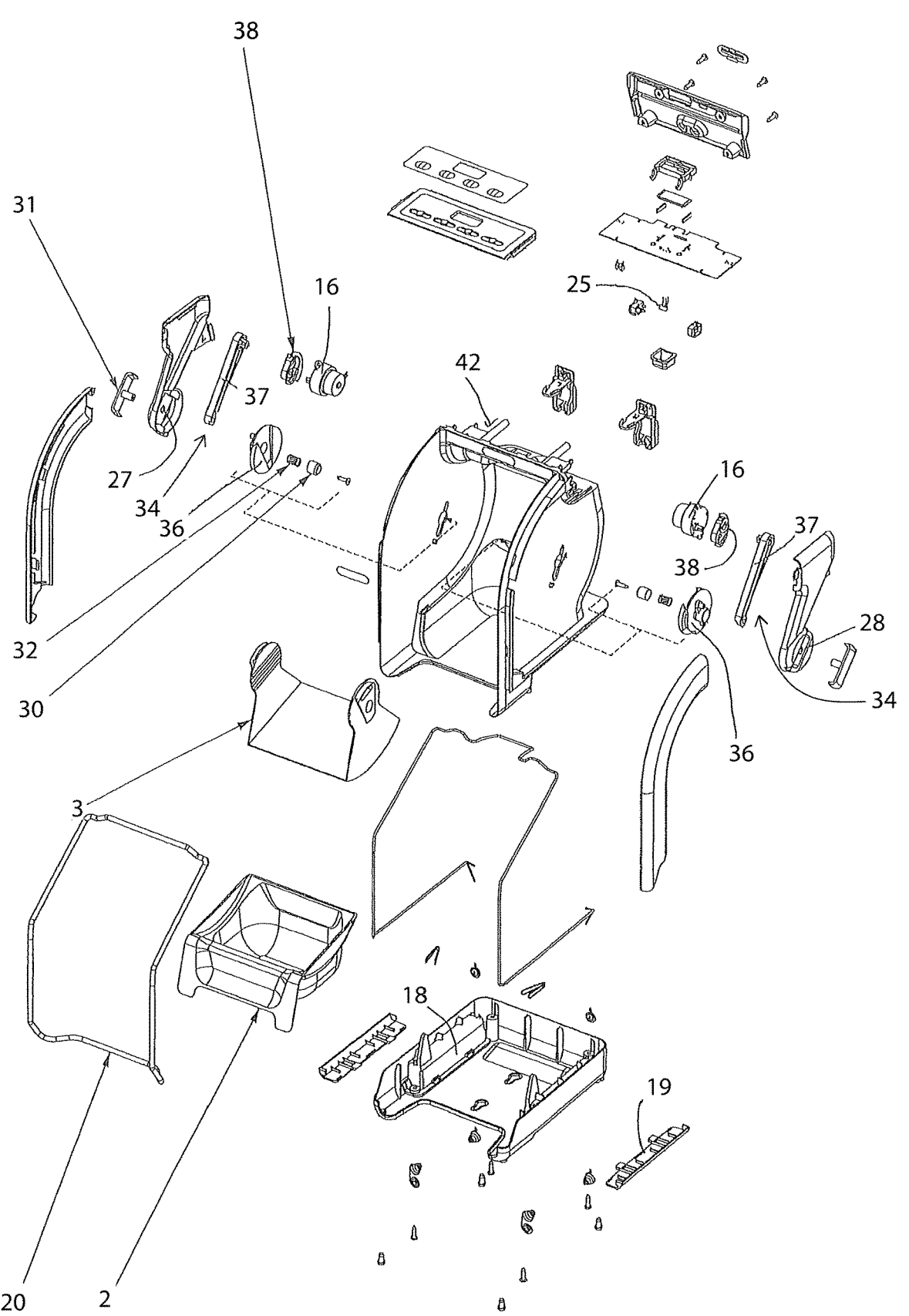
FIG. 14 is an exploded view of the feeder shown in FIGS. 12 and 13.

FIGS. 12-14 show an embodiment of a feeder 1 which includes two motors 16. Each motor 16 is coupled to the cover 3 by a linkage 34 connected to one of the pivots 27, 28 in the manner shown in FIGS. 10 and 11, namely that each linkage 34 is coupled to a pivot 27, 28 and comprises a link arm 35 with two pivoted links 36 and 37 and a rotatable drive cam 38. Each shorter link 36 is coupled to the pivot, while each longer link 37 is pivoted to the cam, which is coupled to motor axle 39. As is shown in FIG. 10, when the cover is closed position, each link 37 is positioned past dead centre of the cam. The result is that a pet attempting to open the cover by pushing at its forward edge will be ineffective in moving the cover. Stop points for travel of the cover in its open and closed positions in the embodiment of FIGS. 12-14 are defined by edges of the cams 38 making contact with a stop (not shown) in the upper part 42 of the feeder. It will be understood that although the embodiment of FIGS. 12-14 has the motors and cams provided at the top of the feeder, these could instead be provided at the base of the feeder, or anywhere else in the feeder that it is desired. Likewise, although the embodiment of feeder with one motor has the motor depicted at the base of the feeder, if a single motor is used that motor could instead be provided at the top of the feeder, or anywhere else in the feeder that it is desired. One advantage provided by the use of at least two motors, each motor being coupled to the cover by a linkage coupled to at least one pivot and comprising a link arm and a rotatable drive cam, the link arm being connected to the cam so that when the cover is in its closed position, the link arm is positioned past dead centre of the cam is the result that that pushing the forward edge of the cover by a pet is ineffective in moving the cover, which enables more secure locking of the cover in its closed position covering the container.

Figures 15, 16, 17:
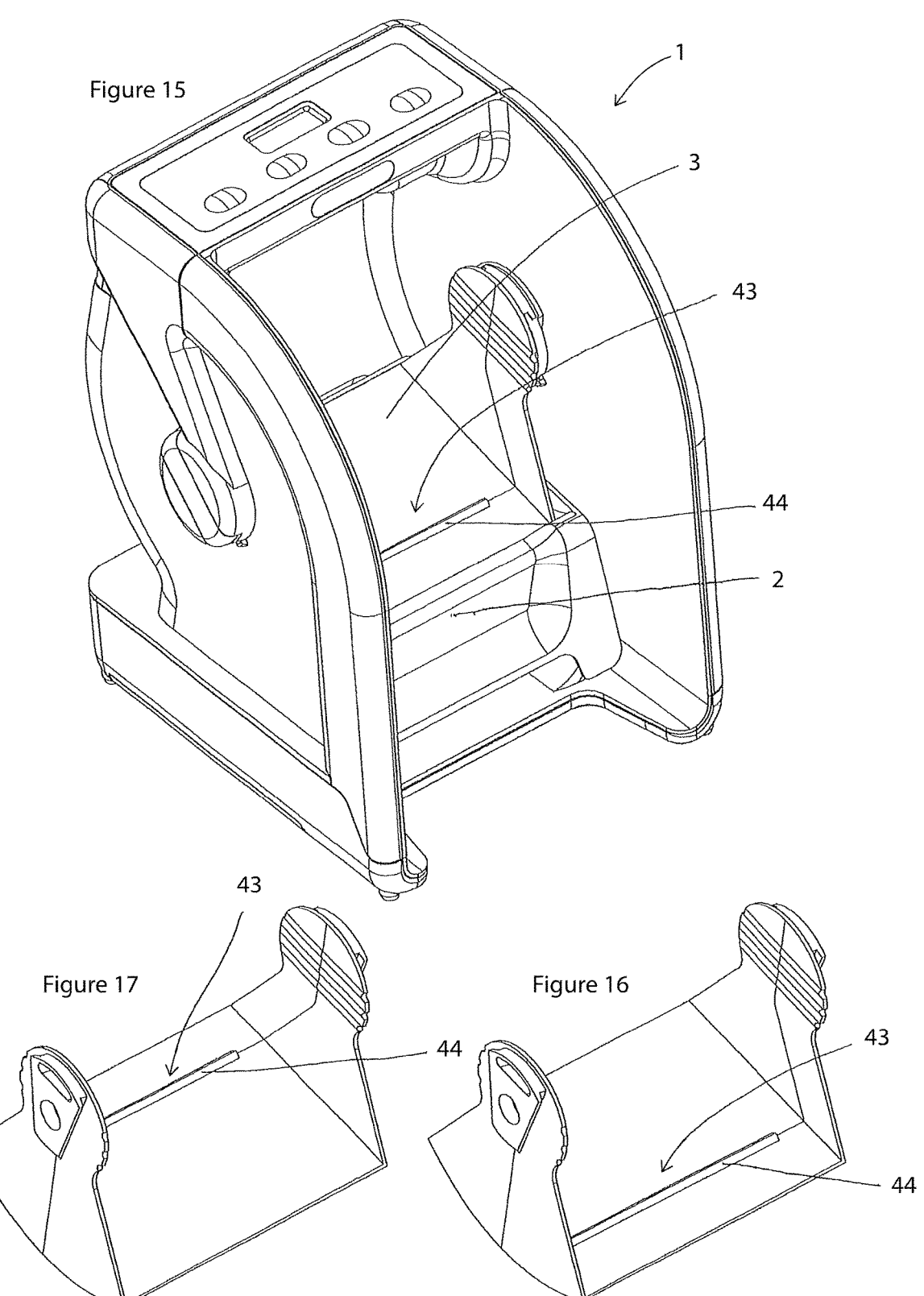
FIG. 15 is a front left perspective view of a feeder wherein the cover has a retainer for retaining food.
FIG. 16 is the cover of the feeder of FIG. 15 in a first orientation.
FIG. 17 is the cover of the feeder of FIG. 15 in a second orientation.

FIG. 15 shows a feeder 1 with a cover 3 in a closed position preventing access to a container 2 that is suitable for holding a first portion of pet food. Cover 3 is pivotable to an open position to allow access to the first portion of pet food. Cover 3 includes a retainer 43 for holding a second portion of pet food. Retainer 43 is formed, in this preferred embodiment, by cover 3 and a retaining wall 44. When cover 3 is in its closed position, food can be placed on top of the cover 3, and the food is held on the cover (in the cover's closed position) by wall 44. When cover 3 is pivoted to its open position, any food that was present in retainer 43 will fall past the wall 44 and land in container 2. Providing a feeder in which a quantity of food can be provided very clearly to a pet through sight and smell entices a pet to approach the feeder to eat the food that the pet has detected in the retainer 43. This provides an aid for training a pet to use a feeder that has a "hidden" portion of food that is revealed somehow, whether by a timer, a motion sensor, an RFID detector, or any combination of the above or any other suitable means of providing intermittent access to a container that contains pet food. Pets that are hesitant to approach or put their heads into a feeder where there is no readily accessible food are more likely to approach and put their heads into a feeder where there is readily accessible food.

For extremely skittish pets, a feeder as shown in FIG. 15 could be introduced by only providing food in retainer 43, and by temporarily disabling the opening of cover 3. Once a pet is comfortable eating food from retainer 43 on the top of cover 3, the opening of cover 3 could be introduced.

FIGS. 16 and 17 show the cover 3 of FIG. 15 in two different orientations. FIG. 16 shows the cover 3 in the orientation used in FIG. 15, in which wall 44 and therefore retainer 43 are provided near the front of the feeder. Cover 3 could alternatively be mounted so that wall 44 and therefore retainer 43 are provided near to the rear of the feeder. When the cover is mounted in the orientation shown in FIG. 17, any food that was present in retainer 43 will still fall past the wall 44 and land in container 2 when cover 3 is rotated to its open position.

Providing a cover that can be mounted in two ways provides two different ways for owners to get their pet or pets used to the feeder and thus provides flexibility for different pets. One advantage provided by providing retainer 43 near to the rear of the feeder is for training pets to use a feeder that is RFID controlled and therefore where the feeder needs to read the microchip in a pet. If a microchip has been placed further back in the pet than is standard, the pet would need to be trained to put their head further into a feeder before their microchip could be successfully read, enabling the majority of their food to be revealed.

Figure 18:
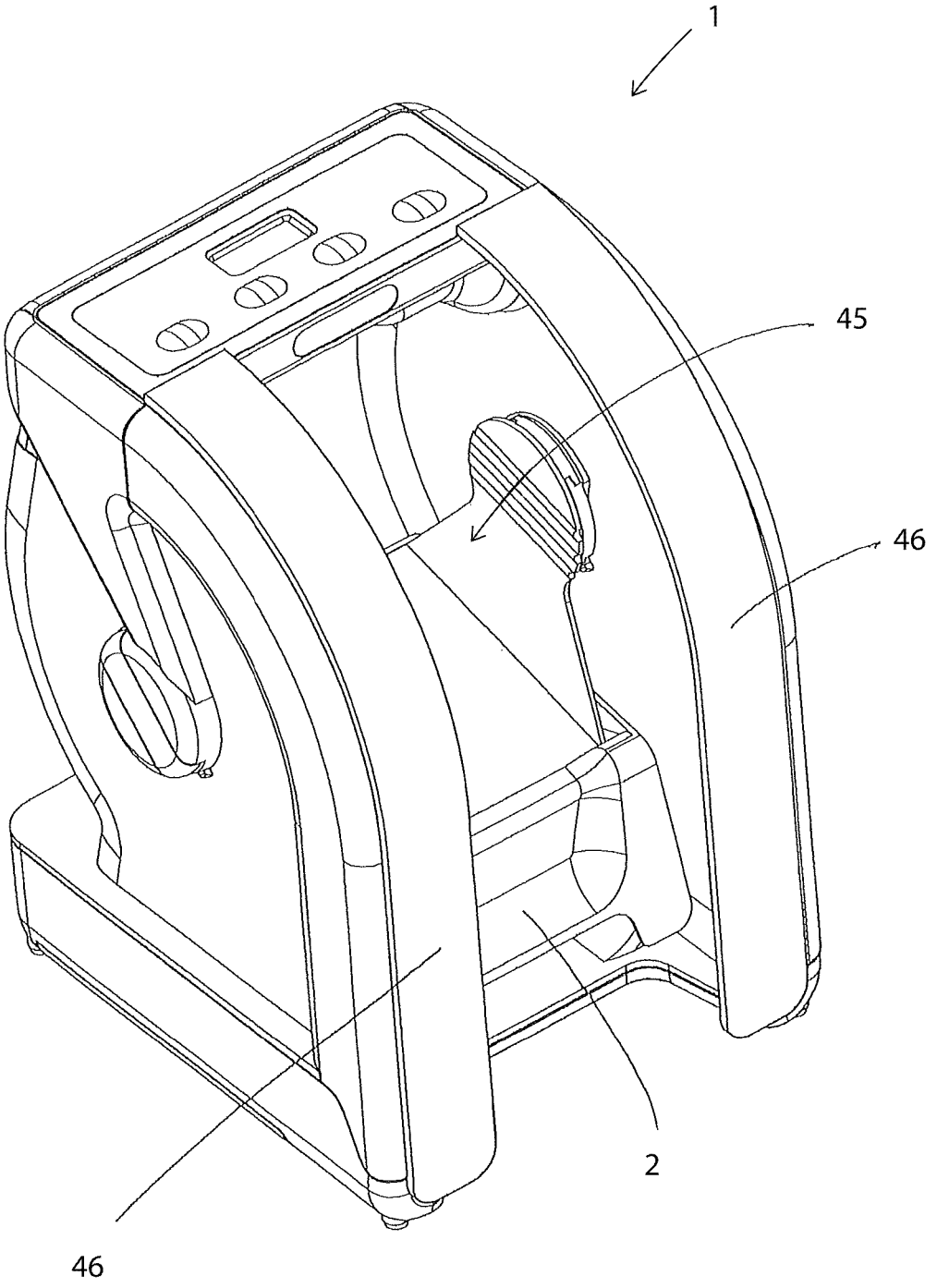
FIG. 18 shows a feeder with two aperture adjusters decreasing the width of the aperture into the housing of the feeder.

FIG. 18 shows a feeder for domestic pets, the feeder comprising an aperture 45 in the housing of the feeder, the aperture 45 allowing a pet access to pet food within container 2 within the housing. As shown in FIG. 18, the width of aperture 45 has been adjusted by fastening two aperture adjusters 46 to the housing so that the aperture 45 is partially occluded. In the preferred embodiment shown in FIG. 18, two aperture adjusters are provided, but it will be understood that using a single aperture adjuster would still reduce the size of the aperture. Each aperture adjuster 46 has a fastener (of any suitable sort) to fasten the adjuster to the feeder. In the embodiment of FIG. 18, the aperture adjusters are made from polypropylene, but other plastics would be suitable. Preferably, the aperture adjusters are trimmable to a desired size by a pet owner, using scissors, or a knife. Alternatively, two or more differently sized aperture adjusters could be provided, that would result in different size apertures.

It will be understood that any of the other above embodiments of pet feeders could be provided one or more aperture adjusters that allow for adjustability of the width of the feeder.

Any of the above embodiments of pet feeders could additionally be provided with connectivity that enables them to be monitored (for example to monitor wanted usage by a pet with an authorised RFID and/or unwanted usage, or to monitor battery life) or controlled remotely (for example to adjust any settings of the feeder, or to provide an override to open the feeder even when no authorised RFID chip is present, to provide software updates) by any suitable means, including but not limited to: a remote control, a smartphone, a tablet, etc.

The invention claimed is:

1. A feeder for a domestic pet, the feeder comprising:
   a container for holding pet food;
   a housing having an open front, a base, respective left and right sidewalls and a rear wall coupled to the base and to the sidewalls, the container being located in the base, and the rear wall extending upwardly from the base and forwardly to provide a roof for the housing and terminating in a forward edge at the open front, whereby the open front is bounded by the forward edge of the roof, forward edges of the sidewalls, and a line joining bottoms of the forward edges of the sidewalls, which line is parallel to the forward edge of the roof but forwardly thereof, and the sidewalls having intermediate portions thereof located at positions between the forward edge of the roof and the said line which intermediate portions extend more forwardly than a plane containing the forward edge of the roof and the said line;
   an RFID aerial to detect the presence of an authorised RFID chip in a pet approaching the open front; the RFID aerial extending across the side walls and the roof at positions adjacent the forward edges of the side walls and of the roof; and
   a cover having a closed position to prevent access to pet food in the container and an open position, the cover being coupled to an electric motor operable when the RFID aerial detects the presence of an authorised RFID chip for movement of the cover from the closed to the open position,
   wherein the left and right sidewalls and the rear wall preventing access by a pet to the food from the rear or from either of the two sides of the feeder and allowing access for only a single pet at a time through the open front to pet food in the container with the cover in the open position.

2. The feeder according to claim 1, wherein the RFID aerial extends across each sidewall in a plurality of generally straight sections from the roof to the bottoms of the forward edges of the sidewalls.

3. The feeder according to claim 2, wherein the RFID aerial extends in two major generally straight sections, with an additional minor straight section from the roof to the bottom of the forward edge of each sidewall.

4. The feeder according to claim 3, wherein an angle formed between the two major generally straight sections is between 100° and 170°.

5. The feeder according to claim 3, wherein an angle formed between the two major generally straight sections is between 110° and 160°.

6. The feeder according to claim 3, wherein an angle between the two major generally straight sections is between 120° and 150°.

7. The feeder according to claim 6, wherein the angle between the two major generally straight sections is 135°.

8. The feeder according to claim 1, wherein the RFID aerial extends in a curve from the roof to the lowermost section of each right and left side wall.

9. The feeder according to claim 1, wherein the RFID aerial does not form a full loop through which the pet's head must pass to reach the container, having no part thereof extending along the said line joining bottoms of the forward edges of the sidewalls, thereby avoiding a step being present at the lower front of the feeder over or on to which a pet must step to reach food in the container.

10. The feeder according to claim 1, wherein the feeder comprises a timer, and wherein the cover is only openable during one or more selected windows of time.

11. The feeder according to claim 10, wherein the RFID aerial is only operable to detect authorised RFID chips during the said window(s).

12. The feeder according to claim 10, wherein the feeder provides a visual and/or an audible signal that a pet may be trained to notice as an indication that the feeder is operable to allow them to reach the food within the feeder.

13. The feeder according to claim 1, wherein the cover is formed in one piece.

14. The feeder according to claim 1, wherein the cover is pivoted with respect to the sidewalls at respective pivots located above the container, and the electric motor is coupled to the cover by a linkage coupled to at least one of said pivots and comprising a link arm and a rotatable drive cam, the link arm being connected to the rotatable drive cam so that when the cover is in the closed position, the link arm is positioned past the dead centre of the rotatable drive cam so that pushing the forward edge of the cover by a pet is ineffective in moving the cover.

15. The feeder according to claim 14, wherein the linkage is located on the opposite side of one of or each right and left sidewall from the cover.

16. The feeder according to claim 14, wherein the cover is removable from the rest of the feeder for cleaning, being coupled to the pivots by a sprung pin connector.

17. The feeder according to claim 1, wherein the feeder further comprises means to lock the container so that a pet cannot remove the container from the feeder, but a human can.

18. The feeder according to claim 1, wherein the sidewalls extend forwardly towards the open front further than the base so that no change of level is presented to a pet entering the open front until the pet reaches the container.

19. A feeder for domestic pets, the feeder comprising:
a container for holding pet food;
a housing having an always open front, a base, respective left and right sidewalls and a rear wall coupled to the base and to the left and right sidewalls, the container being located in the base;

a moveable cover having a closed position to prevent access to pet food in the container and an open position, the moveable cover being pivotable about respective fixed pivots in the left and right sidewalls, and being coupled to a first electric motor operable for pivotal movement of the moveable cover from the closed to the open position in a direction away from the always open front and generally along an inner surface of the rear wall.

20. The feeder according to claim 19, wherein the cover is removable from the rest of the feeder for cleaning, being coupled to the pivots by respective sprung pin connectors.

21. The feeder according to claim 19, wherein the first electric motor is controlled by an RFID detector system configured to detect a pet in the vicinity of the feeder with an authorised RFID chip mounted subcutaneously.

22. The feeder according to claim 19, wherein the first electric motor is controlled to move the movable cover to the open position when a pet is sensed in the vicinity of the feeder by a passive infrared detector or by a capacitive proximity detector.

23. The feeder according to claim 19, wherein the cover is configured to define three positions: a) closed, b) open for a pet to eat, and c) fully open so that the container can be removed.

24. The feeder according to claim 19, wherein the first electric motor is coupled to the moveable cover by a linkage coupled to at least one said pivot and comprising a link arm and a rotatable drive cam, the link arm being connected to the rotatable drive cam so that when the moveable cover is in the closed position, the link arm is positioned past dead centre of the rotatable drive cam so that pushing the forward edge of the moveable cover by a pet is ineffective in moving the moveable cover.

25. The feeder according to claim 24, further comprising a second electric motor, and wherein the first electric motor is coupled to the movable cover by a linkage coupled to the pivot in the left sidewall, and the second electric motor is coupled to the movable cover by a second linkage coupled to the pivot in the right sidewall.

26. The feeder according to claim 24, wherein the linkage is on the opposite side of one of or each left and right sidewall from the movable cover.

27. A feeder for domestic pets, the feeder comprising:
a container for holding pet food;
a housing having an open front, a base, respective left and right sidewalls and a rear wall coupled to the base and to the left and right sidewalls, the container being located in the base, and the rear wall extending upwardly from the base and forwardly to provide a roof for the housing and terminating in a roof forward edge at the open front, the roof forward edge being vertically above the container, the container having a container forward edge and the sidewalls extending forwardly beyond the container forward edge;
the open front being bounded by the roof forward edge, forward edges of the left and right sidewalls, and a line joining bottoms of the forward edges of the sidewalls, which line is parallel to the roof forward edge but forwardly thereof;
a cover having a closed position to prevent access to pet food in the container and an open position to allow access to the pet food;
the left and right sidewalls and the rear wall preventing access by a pet to the food from the rear or from either of the two sides of the feeder, and allowing access for only a single pet at a time through the open front to pet food in the container with the cover in the open position.

28. The feeder according to claim 27, wherein the sidewalls extend forwardly towards the open front further than the base so that no change of level is presented to a pet entering the open front until the pet reaches the container.

* * * * *